FIP8102 XR 3,541,449

INVENTORS
DONALD L. BRODERICK
GAROLD W. CURL
ROBERT A. HOHMANN
BY John E. Wagner INVENTORS
DONALD L. BRODERICK
GAROLD W. CURL
ROBERT A. HOHMANN
BY John E. Wagner INVENTORS
DONALD L. BRODERICK
GAROLD W. CURL
ROBERT A. HOHMANN
BY
John E. Wagner INVENTORS
DONALD L. BRODERICK
GAROLD W. CURL
ROBERT A. HOHMANN
BY
John E. Wagner

FM CHANNEL EVALUATOR WITH AIDED TRACKING AND NULL REJECTION

Filed March 30, 1967

INVENTORS
DONALD L. BRODERICK
GAROLD W. CURL
ROBERT A. HOHMANN

BY John E. Wagner

FM CHANNEL EVALUATOR WITH AIDED TRACKING AND NULL REJECTION

Filed March 30, 1967 6 Sheets-Sheet 6

INVENTORS
DONALD L. BRODERICK
GAROLD W. CURL
ROBERT A. HOHMANN
BY John E. Wagner United States Patent Office 3,541,449
Patented Nov. 17, 1970

3,541,449
FM CHANNEL EVALUATOR WITH AIDED TRACKING AND NULL REJECTION

Donald L. Broderick, Arcadia, Garold W. Curl, Pasadena, and Robert A. Hohmann, Walnut, Calif., assignors, by mesne assignments, to Aerojet-General Corporation, El Monte, Calif., a corporation of Ohio Filed Mar. 30, 1967, Ser. No. 627,133
Int. Cl. H04b 7/02
U.S. Cl. 325—65 7 Claims

ABSTRACT OF THE DISCLOSURE

In a copending application of Donald L. Broderick, Garold W. Curl, and Ray W. Sanders, Ser. No. 605,421, filed Dec. 28, 1966, and now Pat. No. 3,486,118, a system for evaluating the quality of radio transmission channels is disclosed. That system involves the transmission of a particular variable frequency signal interspersed with speech transmission and its detection using a phase-locked loop receiver. The receiver is so arranged that the transient phase locking and tracking capabilities of the phase-lock loop receiver test the signal quality.

This disclosure involves improvements in the phase-lock loop receiver of the above-mentioned system including:

(1) a tracking aiding circuit which allows the phase-locked loop receiver to follow only valid channel evaluation signals; and, (2) a null rejection circuit to prevent the loss of a valid signal due to the random phase relationship of the receiver's reference and the incoming signal at the outset.

This invention relates to multichannel radio communication systems and more particularly to circuitry improvements for determining which of several radio frequency channels are of useful quality for communications purposes.

CROSS-REFERENCES TO RELATED APPLICATIONS

This application relates to an improvement in the system disclosed in the above-mentioned copending patent application, namely, Ser. No. 605,421, filed Dec. 28, 1966 of Donald L. Broderick, Garold W. Curl, and Ray W. Sanders.

BACKGROUND OF THE INVENTION

Field of the invention

In order to increase the reliability of radio communication systems, it has been a common practice to assign a number of communication channels at different carrier frequencies to a transmitting location and allow the selective use of whichever channel provides the best communications link. This arrangement is particularly common in the high frequency 3 to 30 mc. band, where seasonal and daily changes in ionospheric conditions greatly affect transmission. Given a multichannel system capability, the selection of the best channel at each transmission period can be time-consuming if done by trial-and-error method.

Description of the prior art

Apparatus has been designed specifically for facilitating channel selection. One such approach involves the use of a radar back scatter measurement of the ionosphere which gives an indication of the current transmission characteristics allowing selection of the best channel. Other techniques involve the use of one or two-way sounders or tone modulation schemes. The system of the copending application identified above provides a marked improvement over these previous attempts; however, there exists a continuing need for a simple channel evaluator which does not interference with normal voice transmissions and gives a virtually continuous indication of the usable channels available.

Therefore, one general object of this invention is to improve communication channel selection.

Another object of this invention is to improve the lock-on capabilities of phase-lock loop channel evaluation receivers.

Still another object of this invention is to improve the rejection of noise or other interference in phase-locked loop receivers by controlling the tracking rate of a phase-lock loop to correspond to the predetermined frequency-time characteristics of valid signals.

SUMMARY OF THE INVENTION

The objects set forth above are all attained by the system incorporating this invention which comprises basically, at the transmitting station, a generator for short duration variable frequency "chirp" signals injected periodically into the speech channel. Each receiving station contains in addition to the normal receiving equipment, a receiver which detects the "chirp" signal if it exceeds a predetermined amplitude and employs a phase-lock loop circuit to track it in frequency. The phase-locked loop receiver includes:

(a) means normally maintaining the phase-locked loop in a disabled condition;

(b) means releasing the phase-locked loop when the predetermined signal is initially detected regardless of its phase; and, (c) means controlling or aiding the tracking of the phase-locked loop circuit.

If the receiver maintains frequency lock for the duration of the chirp signal, logic circuitry enables an indicator which registers channels acceptability.

BRIEF DESCRIPTION OF THE DRAWING

This invention may be more clearly understood from the following detailed description and by reference to the drawings in which.

DESCRIPTION OF THE PREFERRED EMBODIMENTS

This invention involves an improvement in the basic system of the copending Ser. No. 605,421 identified above. To facilitate comprehension of this improvement, the signal generator and the basic signal detection and demodulation system of that invention are described below and shown in FIGS. 1–6, with the improvement of this invention appearing in FIGS. 7, 9, and 10.

Figure 1:
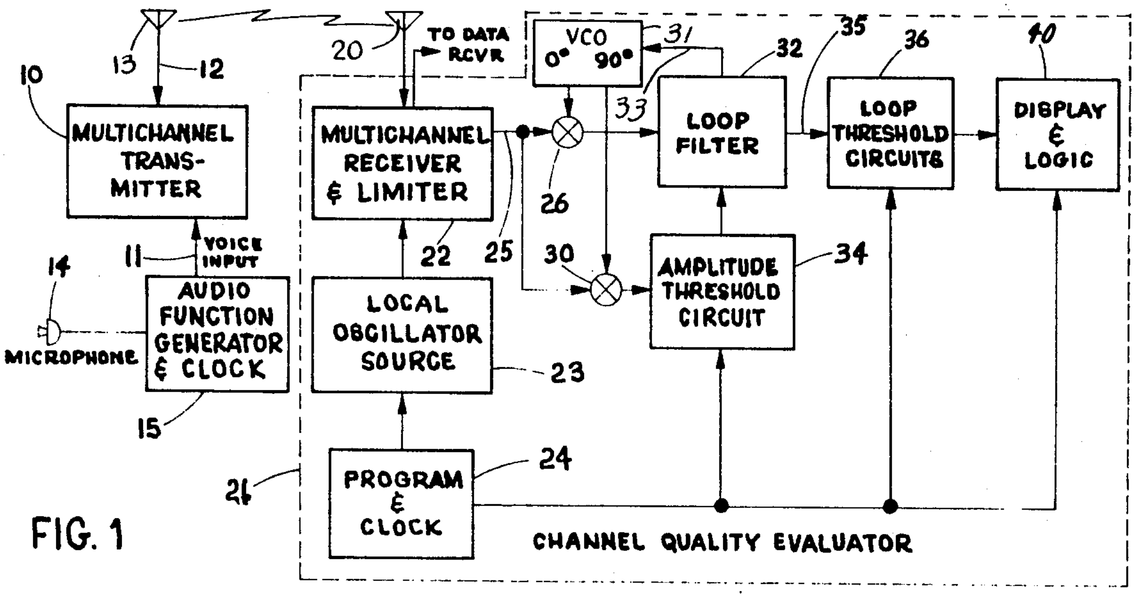
FIG. 1 is a simplified block diagram of a radio communications system incorporating this invention.

Now referring to FIG. 1, a radio transmission system with channel evaluation is shown as including a transmitter 10 with an audio input 11 and an RF output 12 driving an antenna 13. Between a conventional microphone 14 and the transmitter 10 is an audio function generator and clock circuit 15 which is shown in more detail in FIG. 5.

The generator and clock circuit 15 is shown as interposed between the microphone 14 and the audio input to the transmitter 10. This arrangement is preferred so that a conventional multichannel transmitter can be operated using this invention merely by plugging the generator and clock circuit 15 into the transmitter microphone jack and the microphone into the circuit 15. The audio function generator and clock 15 may be self-contained and self-powered and easily removable when channel evaluation is not needed. The audio function generator and clock circuit 15 serves to produce a time-frequency varying signal herein termed the "chirp" signal of frequency range approximating the voice channel bandwidth (e.g., 300–3000 c.p.s.) and duration of 100 milliseconds or less. The clock portion of assembly 15 produces a gating pulse periodically, such as one pulse each nine seconds. The gating pulse momentarily interrupts the speech channel from the microphone and substitutes the "chirp" signal.

At the receiving station, a conventional broadband antenna 20 is connected to both the information or data receiver of the communication system which is unshown in the drawing, and to the channel quality evaluator 21 of this invention. The channel quality evaluator 21 includes, as an input stage, a step-tuned receiver and limiter 22 which is described in more detail below and shown in FIGS. 6 and 7. The receiver 22 is step-tuned to the center frequency of each of the channels in sequence in a cycle which takes, for example, 10 seconds to sample all channels in sequence by changing the frequency of a local oscillator 23 under the control of a program and clock assembly 24. The operation of the program and clock assembly and local oscillator source are likewise explained in more detail in connection with FIGS. 6 and 7.

Suffice it to say in normal operation of the channel quality evaluator 21, the step-tuned receiver and limiter produces in sequence a hard-limited signal at the nominal center frequency of each channel in sequence on lead 25, where it is introduced into two mixers or phase comparators 26 and 30, to be mixed with the output of a single voltage-controlled oscillator 31 $f\angle\theta$ and $f\angle\theta+90$ respectively. The product of the mixer 26 is introduced into loop filter 32 tuned to pass unidirectional or low frequency voltages to the control input of the voltage controlled oscillator 31 over lead 33.

As just described, the interconnection of the mixer 26, loop filter 32 and voltage controlled oscillator 31, describes a classic phase-locked loop or tracking filter of the type disclosed in "Space Communications," edited by A. V. Balakrishnan, McGraw-Hill Book Company, N.Y., copyright 1963, Chapter 8. However, in this invention the loop filter 32 is normally maintained in a shorted condition by an input from an amplitude threshold circuit 34 connected both to the mixer 30 and the program and clock assembly 24. The loop filter 32 is normally maintained in a shorted or disabled condition, causing the voltage controlled oscillator to be locked at a predetermined "rest" frequency, for example 2700 cycles per second, which is in the range of the "chirp" signal of the system. This normal rest frequency of the voltage controlled oscillator is designed to be close to the starting frequency of the "chirp" signal.

Figure 2:
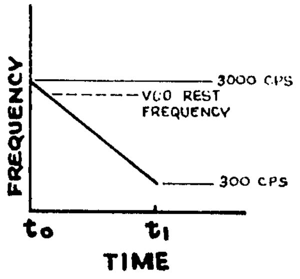
FIGS. 2 and 3 are graphical representations of the frequency-time and amplitude-time characteristics of the channel quality evaluation signal transmitted.
Figure 3:
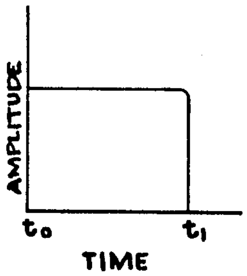
Figure 4:
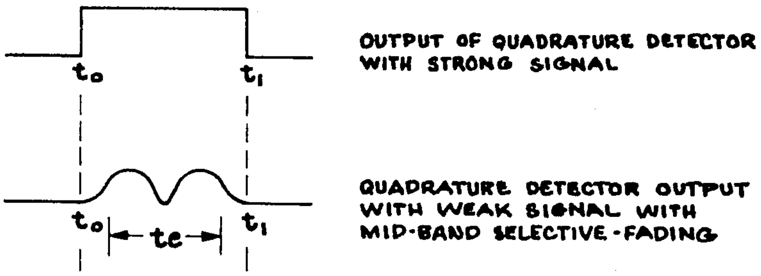
FIG. 4 is a graphical representation of the output of the channel evaluator with (a) an acceptable channel and (b) a channel with mid-frequency fading.

The frequency-time characteristic of a recomemnded "chirp" signal is illustrated in FIG. 2, while the amplitude-time characteristic of the "chirp" signal is shown in FIG. 3. The signal sweeps across the modulation band of the transmitter at a constant signal amplitude. During "chirp" signal transmission as the voltage controlled oscillator rest frequency is crossed by the "chirp" signal, the phase lock loop will attempt to lock on to the "chirp" signal and at the same time, the same signal from the receiver reaching mixer 30 produces an output to the amplitude threshold circuit which will indicate the presence of a coherent signal at the rest frequency.

If the signal-to-noise ratio of that coherent signal is great enough, the threshold will be exceeded and the threshold circuit 34 will remove the short from the loop filter 32, thereby allowing the voltage controlled oscillator to track the incoming frequency-time function of the incoming "chirp" signal. If the signal-to-noise ratio remains above the preset threshold for the remainder of the "chirp" signal sweep, the loop will be complete and operative and phase lock will be maintained for the remainder of the "chirp" signal. The loop signal from the loop filter 32 is fed by lead 35 to a loop threshold circuit 36 having one or two additional amplitude thresholds both of which must be exceeded during a pre-selected time less than the duration of the "chirp" signal in order to register that a "chirp" signal of adequate signal-to-noise ratio has been received. When these additional thresholds are exceeded, the loop threshold circuit 36 applies a pulse to the display and logic circuit 40, which indicates the channel is usable.

Both the loop threshold circuit 36 and display and logic circuit 40 are under the control of the program and clock assembly 24 so that each are operative simultaneously and reset at the end of each sampling period. The display system incorporates a lamp or other indicator energized to indicate the usable channel. The display and logic assembly 40 is described in more detail in connection with FIG. 7.

Referring again to FIGS. 2 and 3, the "chirp" signal generated at the transmitter has two characteristics which are designed to facilitate channel evaluation. The signal sweeps over the full bandwidth of the channel in a sigficant period of time, such as 100 milliseconds, in order to give an indication of both time and selective frequency fading which might render the channel unusuable. This is in contrast with previous channel sampling systems which do not indicate full channel usability. Likewise, using the variable-frequency characteristic allows the receiver to utilize the transient or lock-on characteristics of a phase lock loop in determining the channel quality. It should be noted that in connection with FIG. 3 the "chirp" signal maintains a constant amplitude despite variation of frequency, thereby allowing the amplitude threshold circuits of the receiver to be preset to a uniform amplitude.

Figure 5:
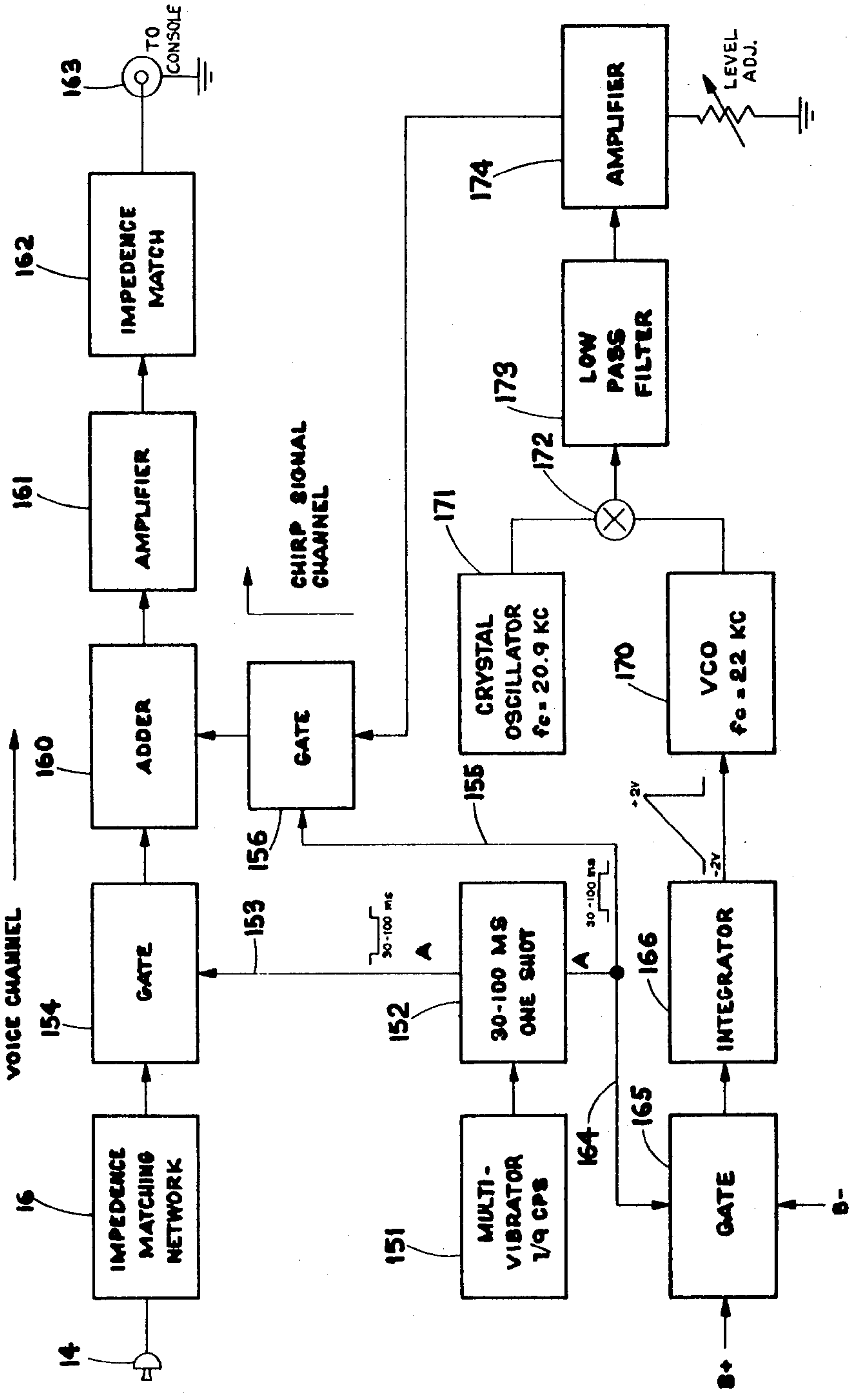
FIG. 5 is a block diagram of the audio function generator of FIG. 1.

Now referring to FIG. 5, the details of the audio function generator and clock 15 of FIG. 1 may be seen. The basic time function of the function generator and clock 15 comprises a free-running multivibrator 151 having a pre-selected pulse rate, for example 1/9 cycles per second, which provides a trigger pulse to a variable duration, one shot multivibrator 152. The multivibrator 152 has two outputs, one inverted pulse over lead 153 to a gate 154 in the voice channel and a positive pulse output on lead 155 controlling a gate 156 in the "chirp" signal channel. The conventional microphone 14 designed for the transmitter is connected through an impedance matching network 16 to the gate 154 which is designed to remain in a conducting condition to allow speech transmission at all times except during the period of "chirp" signal generation. Gates 154 and 156 are controlled to be alternately conducting whereby whichever signal passes through its conducting gate is combined in adder 160, amplified in amplifier 161, and then via impedance matching network 162, is applied to the output terminal 163 of the circuit 15.

The positive pulse from the one-shot multivibrator 152 is additionally applied over lead 164 to a gate 165 controlling an integrator 166, the latter of which produces a ramp function of length equal to the time duration of the one-shot multivibrator pulse and of suitable peak amplitude to drive a voltage controlled oscillator 170 over the selected "chirp" frequency range. In this particular case, for convenience, the voltage controlled oscillator is selected from standard components designed to meet IRIG standards and nominally operates at 22 kilocycles per second. The voltage controlled oscillator frequency is converted to the selected audio frequency range of 3000 c.p.s. to 300 c.p.s. by mixing with the output of a stable crystal oscillator 171 in a mixer 172. Unwanted products of the mixing operation are removed by a low pass filter 173 having the required frequency pass band and the resultant "chirp" signal is amplified in amplifier 174 and applied to the gate 156.

The circuit 15 cyclically interrupts the speech path between the microphone 14 and the transmitter console to inject a swept frequency "chirp" signal of short duration into the transmission channel. Actual user tests show that a "chirp" signal of less than 100 ms. in length is not disturbing to the ordinary listener and does not result in any significant degradation of the voice channel communication efficiency.

Figure 6:
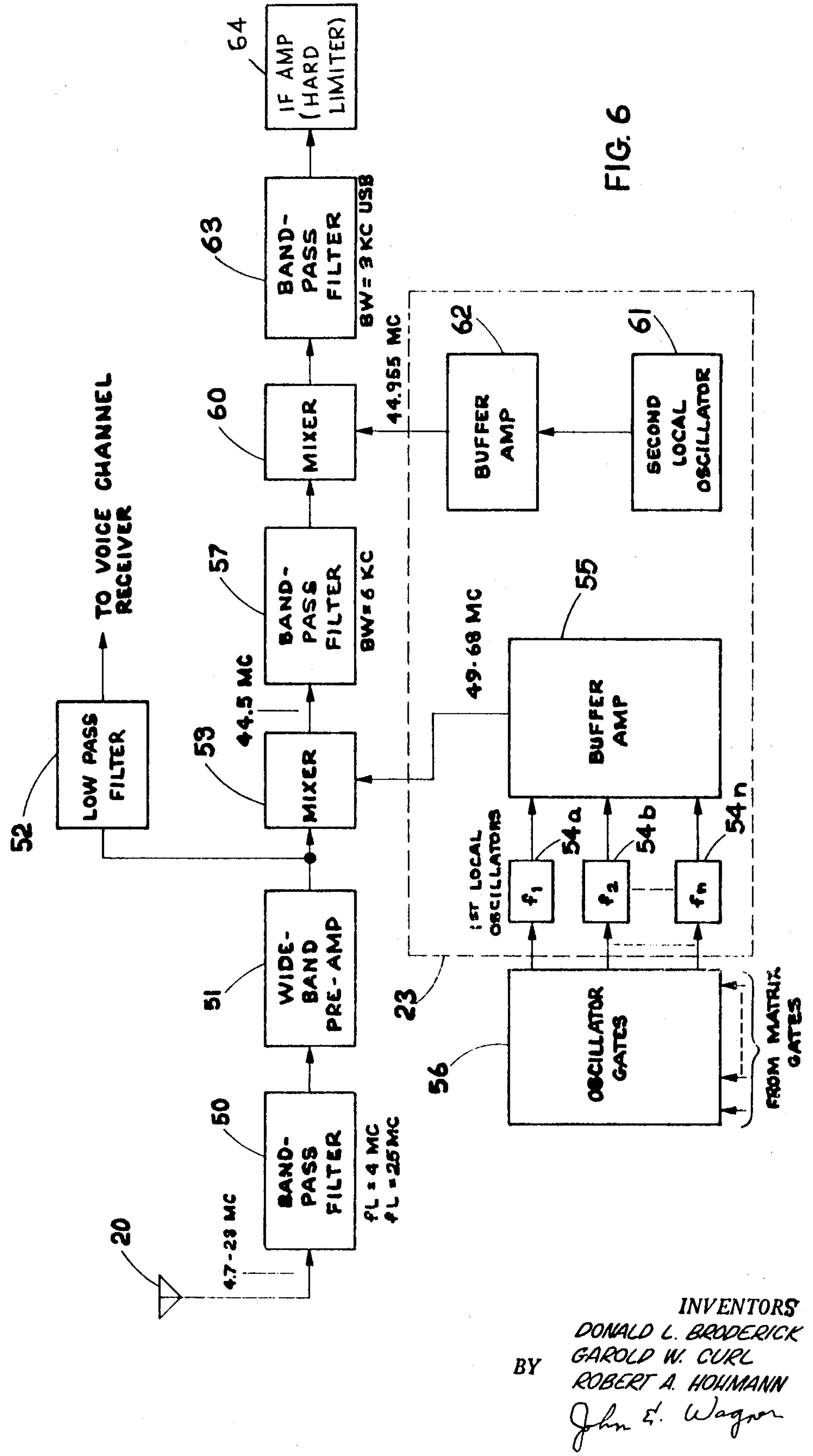
FIGS. 6 and 7 constitute a detailed block diagram of the channel quality evaluator of FIG. 1.
Figure 7:
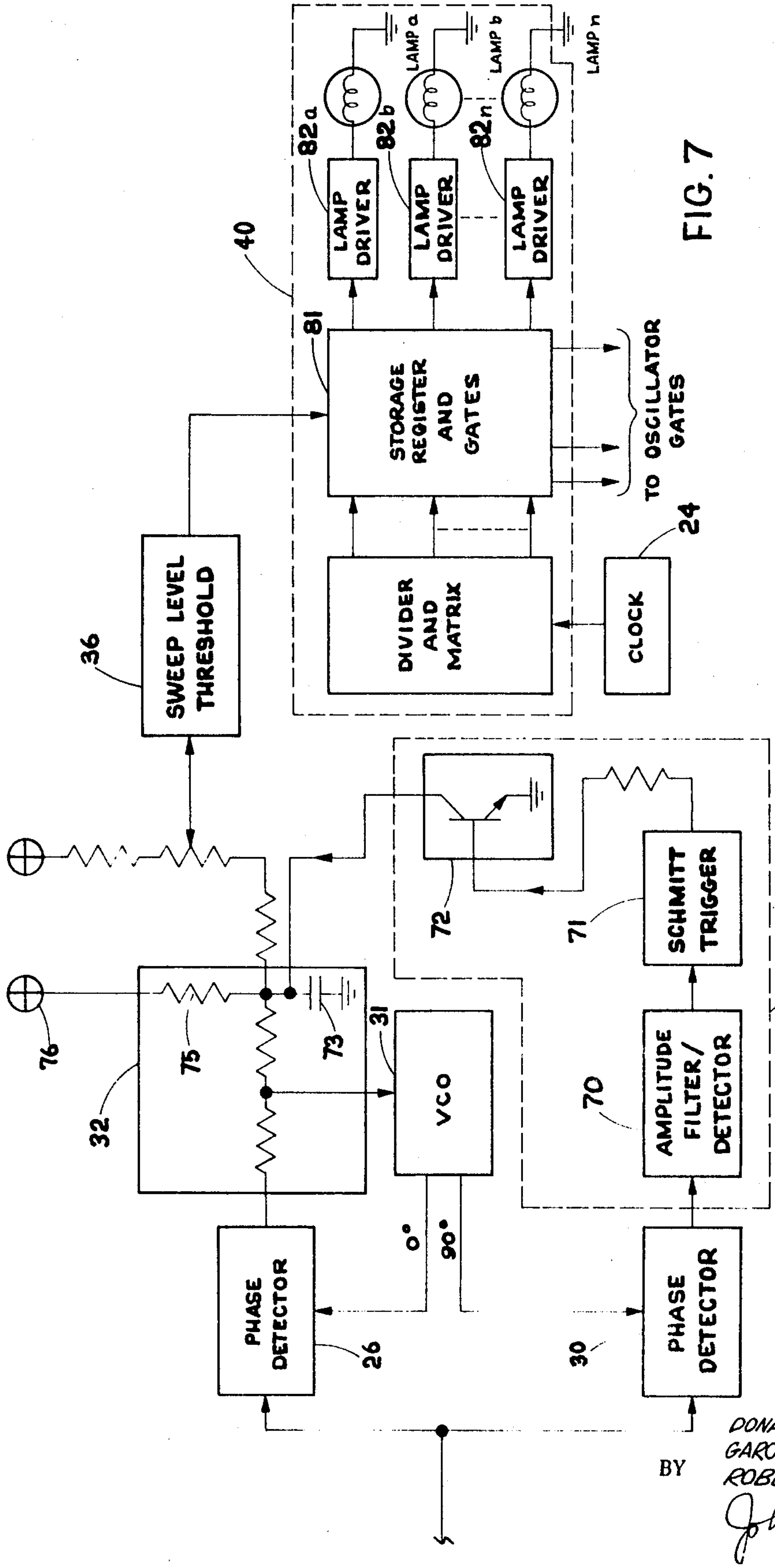
Figure 8:
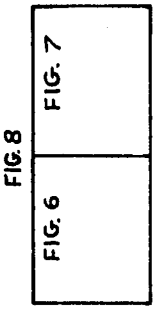
FIG. 8 is an illustration of the arrangement of FIGS. 6 and 7.

The receiving station channel evaluator 21 of FIG. 1 is shown in more detail in FIGS. 6 and 7 in order to explain the concept of this invention more clearly. Incoming signals at the receiving antenna 20 are passed through a band-pass filter 50 designed to reject unwanted noise and signals and then amplified in a wideband preamplifier 51 after which the received signal is introduced into the normal voice channel receiver and into the channel quality evaluator of this invention. The voice channel includes a low pass filter 52 designed to filter out the local oscillator frequencies of the channel evaluator signal. The composite speech plus channel merit signal is translated to a desired signal processing frequency, for example 44.5 mc./s., in a mixer 53 when combined with the output of the local oscillator 23.

The latter actually includes a separate first local oscillator **54*a*–54*n* for each transmission channel of the system and a common buffer amplifier 55. The first local oscillators 54*a*–*n* are sequentially energized under control of a series of oscillator gates 56 and under control of the logic circuitry 40** of FIG. 7.

The first local oscillators **54*a*–*n* are always at a fixed frequency difference, for example 44.5 mc./s., above the desired signal frequency and are switched at a slower rate than the "chirp" signal generator rate. In a typical case, the "chirp" signal generator of FIG. 5 injects a signal into all channels simultaneously every nine seconds and the first local oscillators 54*a*–*n* of the receiver are energized in sequence for periods of 10** seconds each insuring coincidence with one "chirp" signal. After a period of 80 seconds, an entire 8 channel system has been evaluated and the cycle can be repeated. With larger or smaller numbers of channels, the sampling period varies proportionately.

The translated signal from the mixer 53 is then passed through a narrow band-pass filter 57 and into a second mixer 60, where it is mixed with the output of a second oscillator 61 as amplified by amplifier 62. The second IF oscillator 61 is free-running at a frequency either above or below the first IF frequency to produce the selected second IF, for example 455 kc., a lower more usable frequency. The second IF is then filtered to remove the unwanted side band in a band-pass filter 63 and amplified in a hard limiting amplifier 64 which removes all amplitude variations prior to demodulation in the unique phase-locked loop circuit of this invention.

The limited signal is injected into the two phase comparators 26 and 30 of the channel quality evaluator 21.

As indicated above in connection with the description of FIG. 1, the voltage controlled oscillator 31 is normally held at a frequency near the beginning of the "chirp" signal sweep range. Whenever the received signal contains the rest frequency, its signal-to-noise ratio at that frequency is tested by the loop amplitude threshold circuit 34. This circuit 34 actually includes a filter and amplitude detector 70 producing a unidirectional varying voltage output proportional to the phase coherence of the voltage controlled oscillator output and the incoming signal. However, transistor 72 normally provides a constant voltage input to the voltage controlled oscillator and maintains the loop filter network 32 disabled. The constant voltage input to the voltage controlled oscillator 31 holds the voltage controlled oscillator at or near its rest frequency.

A Schmitt trigger circuit 71 establishes a threshold for an acceptable signal-to-noise ratio. When the threshold is exceeded, the output of the Schmitt trigger 71 is applied to the base of the switching transistor 72, which in turn enables the loop filter 32.

THE INVENTION

The system of signal generation and detection as described to this point all correspond to the system of the copending application of Broderick, Curl, and Sanders. The signal detector of this invention not only requires that the rest frequency be detected as in the basic system, but the signal thereafter must vary in frequency at a time rate corresponding to valid signals, to wit, the linear variation as shown in FIG. 2. This is accomplished by selection of the phase-lock loop parameters to provide a bandwidth sufficiently narrow so that operation at desired signal-to-noise ratios is possible. The phase-lock loop is deliberately designed to be incapable of unaided tracking of the FM sweep signal. Tracking the sweep signal is accomplished by supplying a filter input voltage, independent of small phase errors, which will force the voltage controlled oscillator frequency to sweep the same range, and at the same rate, as the transmitted FM sweep signal. The phase-detector output is thus required only to make phase corrections. This results in a smaller tracking error than would be required without the "aided tracking." Phase-lock loop parameters are in fact such that, because of the nonlinear phase detector output, the loop could not track the FM sweep signal unaided.

The "aided tracking" input to the loop filter is supplied by the output of the amplitude discriminator circuit 34. The loop filter 32 is also prevented from charging its integrating capacitor 73 until the amplitude threshold logic indicates presence of a received signal within acquisition range of the modified loop.

Thus, initiation of the forced sweep of the voltage controlled oscillator 31 can occur only when a signal is received within a range of frequencies determined by the natural center frequency of the voltage controlled oscillator 31 and loop characteristics with the integrating capacitor shorted. Once initiation of the forced sweep has occurred, the forced sweep will dominate operation of the loop integrator with only small corrections by the phase detector. If the received signal is not the FM sweep sounding signal, the forced sweep will cause loss of amplitude threshold before completion of the forced sweep and will thus short the integrating capacitor and prevent completion of the full sweep range.

With the capacitor 73 short circuited, the loop filter 32 maintains a constant voltage input to the voltage controlled oscillator 31 holding it at its rest frequency. Removing the short circuit on the capacitor 73 allows the phase-locked loop to vary in frequency. When the transistor 72 is cut off and capacitor 73 unshorted, the voltage on capacitor 73 rises as a function of the current from a source 76 through a resistor 75. The values of the capacitor 73, resistor 75 and source 76 are selected to provide a charge rate corresponding to the slope of valid channel evaluation signals as shown in FIG. 2. Typical values to obtain the frequency-time characteristic of FIG. 2 are capacitor 73, 40 mfd.; source 76, 20 volts DC and resistor 75, 0.1 megohm.

This feature which we term forced or aided sweep of the phase-lock loop circuit takes advantage of both the transient lock-on and tracking characteristics of a phase-lock loop circuit.

Figure 9:
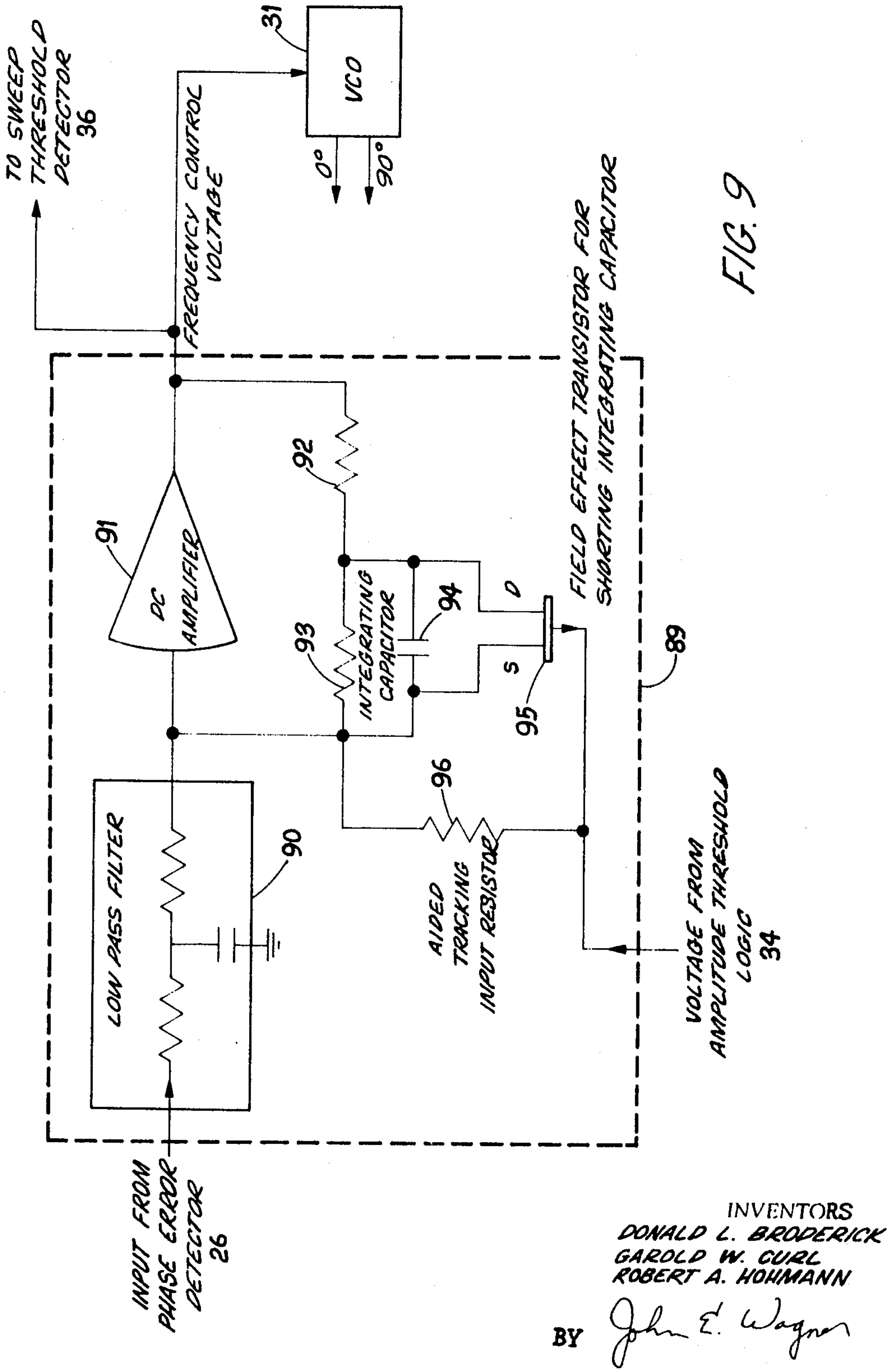
FIG. 9 is a simplified schematic of an alternate circuit for aiding the tracking of the phase-locked loop.

An alternate embodiment for the aided tracking circuit of FIG. 7 is shown in FIG. 9. It should be apparent from the above description of the circuit of FIG. 7 that the tracking-aiding function is obtained by controlling the voltage controlled oscillator with a resistive-capacitative integrating circuit including capacitor 73. The voltage charge curve of the circuit of FIG. 7, of course, is exponential and therefore, linear over only relatively narrow ranges. For most applications, this is adequate to achieve signal detection at reasonable signal-to-noise ratios. However, greater discrimination in the receiver is desirable to avoid tracking of noise or speech.

This is achieved in the embodiment of FIG. 9, which shows an active filter 89 designed to be directly substituted for the network 32 in FIG. 7. It includes a low pass filter 90 fed with phase error signals from phase detector 26 and providing the signal input to a DC or operational amplifier 91. The amplifier 91 provides the frequency controlling input to the voltage controlled oscillator 31 and has a feedback path including resistors 92 and 93, the latter of which is shunted by a capacitor 94. This capacitor is the basic integrating component corresponding to the capacitor 73 of FIG. 7.

Capacitor 94 is normally shorted by a field effect transistor 95 which is switched to an open circuit condition by signals from the amplitude logic threshold circuit 34. During normal quiescent operation, the resistor 92 and conducting transistor 95 form a feedback path for amplifier 91. This arrangement maintains the DC amplifier operational at all times and allows the voltage controlled oscillator 31 to drift in frequency in a narrow range under the control of phase error signals from phase detector 26. This facilitates early lock-on to valid signals.

As the amplitude threshold signal from circuit 34 switches the transistor 95, the same signal is applied also to the input of amplifier 91, through a resistor 96 causing an incremental increase in output voltage of amplifier 91 followed by linear tracking as the capacitor 94 charges. This arrangement not only provides the improved linearity of Miller-sweep-type circuit performance, but also provides an initial incremental step upon signal detection to compensate for any delay in lock-up of the circuit to the incoming signal.

NULL REJECTION CIRCUITRY

Figure 10:
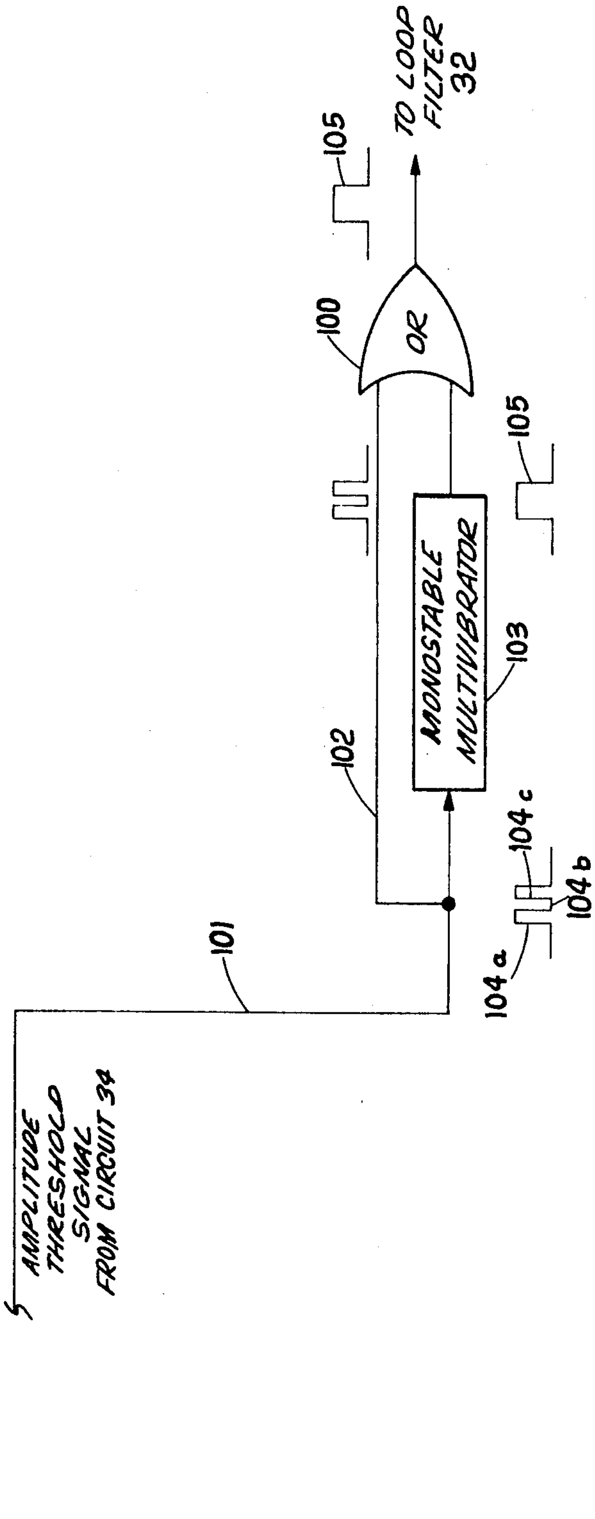
FIG. 10 is a block diagram of a sub-assembly null-rejection circuit for improving the signal capture ability of the receiver of this invention.

Given the improved tracking capability of this invention using either the circuits of FIG. 7 or FIG. 9, the initial transient conditions become significant, particularly the phase relation of the incoming signal and the output of the voltage controlled oscillator 31. It is possible that due to the random phase relation at the instant the rest frequency is passed, insufficient phase coherence exists to allow phase locking to occur. This possibility is accentuated since the tracking capability of the phase lock loop has been restricted by the active filter of FIG. 9. This limitation of the foregoing system may be eliminated by the addition of the logic circuitry of FIG. 10 to the system of FIGS. 1 and 7. It includes basically an OR gate 100 connected between the amplitude threshold circuit 34 and the loop filter 32. One input comes directly from the circuit 34 over leads 101 and 102, and the second input to the OR gate 100 is through a monostable multivibrator 103. This latter device is triggered by signals from the threshold circuit 34 above the established threshold regardless of their duration and furnishes an output pulse uniform in amplitude and duration. A typical situation requiring the null rejection circuit of FIG. 10 is illustrated by the pulses depicted in FIG. 10. Where there occurs sufficient phase coherence between the incoming signal and the voltage controlled oscillator 31 output to exceed the threshold of circuit 34, an output pulse occurs on lead 101. In the case of minimum coincidence, the output of threshold circuit 34 will be an initial short duration pulse **104*a* followed by a null 104*b* and a short terminal pulse 104*c*. Neither pulse 104*a* or 104*c* is of sufficient duration to cause the phase-lock loop circuit to lock onto the incoming signal. The monostable multivibrator 103 in effect stretches the pulse 104*a* to full pulse length 105** sufficient to overlap any null periods and insure locking of the phase-locked loop.

Employing the null rejection circuit of FIG. 10 with either the passive tracking filter FIG. 7 or active filter FIG. 9, improved tracking of channel quality signals is insured. In particular, noise discrimination is enhanced.

If phase lock is maintained until the thresholds of the sweep level circuit 36 of FIGS. 1 and 7 are exceeded, an output pulse is applied to the logic and display circuitry 40. The storage and display logic circuit 40 is enabled to sample the output of the sweep threshold circuit 36 only during a limited period corresponding to the end of a sweep signal (time $t_1$). This circuitry 40 is driven by the clock 24 and includes a conventional divider and matrix circuit 80 for applying clock pulses to a storage register and gate assembly 81 of well-known design. The register and gate assembly 81 sequentially enables the gates 56 of FIG. 6, thereby energizing the first local oscillators **54*a–n* in sequence and simultaneously completes the signal path to the corresponding lamp driver circuits 82*a* to 82*n*. The trigger pulse from the sweep threshold circuit 36 reaching the storage register and gate assembly 81 passes through a conducting gate 81 to its appropriate lamp driver circuit 82*a–n*** lighting the lamp corresponding to the channel under test.

If phase lock is lost before the storage register and gates 81 are enabled by monostable multivibrator 37, then the sweep threshold is lost and no output pulse occurs.

The storage register and gates 81 are designed to hold any energized lamp on for the entire sampling period for all channels, for example 80 seconds. Therefore, during the operation of the system, a channel into which the evaluation signal is injected and detected is registered as usable by the lighted lamp. The lamp will remain lighted as long as each sequential evaluation signal over that channel is detected.

In use, the operator at the receiving station merely monitors the display board during transmission and can indicate by voice or other means to the transmitting station which channels are usable. Any channel or midband fading during transmission is immediately apparent to the receiver operator who can direct a change of channel without any significant loss of communications contact.

The foregoing is a description of one or more embodiments of our invention. It is recognized that one skilled in the art can devise variations from the specific forms in which our invention is illustrated. In accordance with the Patent Laws of the United States, the rights granted thereunder are not limited to the specific embodiments illustrated, but rather by the scope of the following claims and their equivalents.

We claim:

1. In the receiver of a communications system in which channel selection is made in accordance with reception reliability as indicated by the detection of a chirp signal, a detector, comprising:

- a phase detector, a filter and an oscillator,
  - said phase detector responsive to the receiver chirp signal input and the output of said oscillator,
  - said filter responsive to the output of said phase detector and having a charging circuit for storing voltage with a charging rate variable and tracking with the rate of change of frequency of the chirp signal, said filter providing the output for the detector, and
  - said oscillator responsive to the output of said filter so that its frequency is determined by the voltage of said charging circuit;
- an inhibitor connected so as to cut off said charging circuit;
- a generator responsive to the receiver chirp signal input to generate a signal when its input exceeds a threshold; and
- means to connect the output of said generator so as to disable said inhibitor.

2. The receiver of claim 1 and means to provide operation of the receiver at a plurality of carrier frequencies sequentially:

3. The receiver of claim 1 wherein said generator includes a phase detector responsive to the received signal and to said oscillator;

a trigger responsive to said second phase detector; and whereby said connector means connects from the output of said trigger to said inhibitor.

4. The receiver of claim 3 wherein said inhibitor comprises a transistor conductive except when said trigger is excited.

5. The receiver of claim 1 and an operational amplifier in said filter connected to said charging circuit to provide linearity of the charge rate.

6. The receiver of claim 1 wherein said connector means includes means to generate a pulse of duration approximating that of the chirp signal whereby said inhibitor is disabled by said generator for a period exceeding the duration of the chirp signal.

7. The receiver of claim 6 wherein said means comprises a multivibrator responsive to the signal from said pulse generating inhibitor to provide the chrip signal approximating pulse and an OR gate responsive to the signal from said inhibitor to pass the pulse from said multivibrator to said charging circuit.

References Cited

UNITED STATES PATENTS

| | | | |
|---|---|---|---|
| 2,422,664 | 6/1947 | Feldman | 325—65 |
| 3,375,443 | 3/1968 | Salmet | 325—55 |
| 2,448,055 | 7/1948 | Silver et al. | 325—131 |
| 3,274,494 | 8/1966 | Stanley | 325—420 |
| 3,290,603 | 12/1966 | Rabow | 325—421 |
| 3,329,900 | 7/1967 | Graves | 325—346 |

ROBERT L. GRIFFIN, Primary Examiner

B. V. SAFOUREK, Assistant Examiner

U.S. Cl. X.R.

325—35, 131, 335, 344, 422